United States Patent Office 3,655,700
Patented Apr. 11, 1972

3,655,700
OXYGENATED UNSATURATED ALIPHATIC CARBOXYLIC ACIDS AND ESTERS
John B. Siddall, Palo Alto, Calif., assignor to Zoecon Corporation, Palo Alto, Calif.
No Drawing. Filed Feb. 2, 1970, Ser. No. 7,988
Int. Cl. C07c 69/66, 69/52; A01n 9/24
U.S. Cl. 260—405
7 Claims

ABSTRACT OF THE DISCLOSURE

Preparation of polyolefins involving photooxygenation of an isolated double bond of a polyolefin to allylic hydroperoxide which is reduced to the allylic alcohol, the allylic alcohol is converted to the allylic acylate which is alkylated using organolithium cuprate.

---

The present invention relates to a process for the alkylation of olefinic compounds and intermediates therefor. More particularly, this invention involves the preparation of long chain polyolefins which comprises the photooxygenation of an isolated double bond of a polyolefin to the allylic hydroperoxide, reduction of the allylic hydroperoxide to the allylic alcohol, esterification of the allylic alcohol to the allylic acylate and alkylation of the allylic acetate by treatment with lithium di-organo cuprate.

The process of the present invention can be illustrated by the following outline:

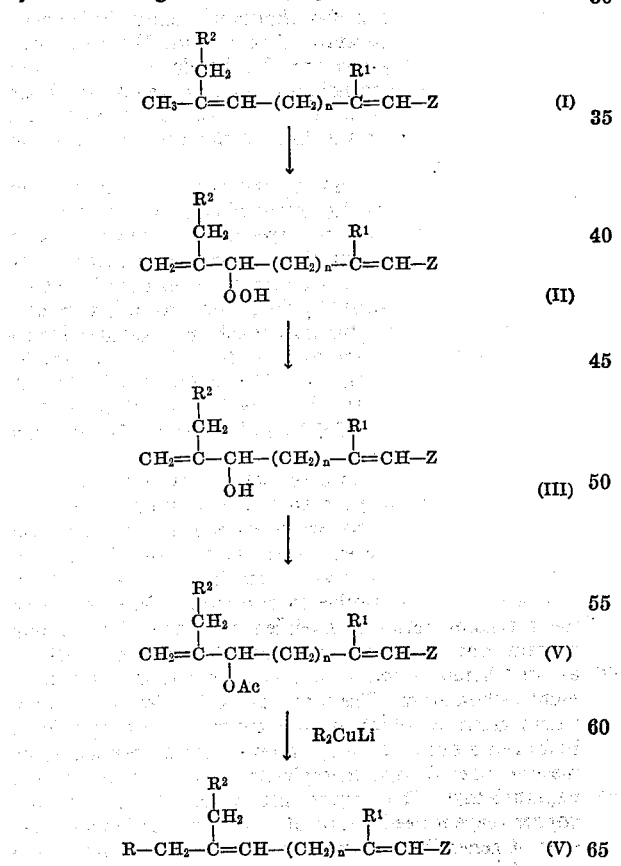

In the above formulas, $n$ is an integer of one to four; $R^1$ is lower alkyl; $R^2$ is hydrogen, a hydrocarbon group, such as alkyl or alkenyl, or a substituted hydrocarbon group, such as 2,3-epoxy-3-methylpentyl, 2,3-cyclopropyl-3-methylpentyl, 3-fluoro-3-methylpentyl, 2,3-epoxy-3-methylbutyl, 2,3-cyclopropyl-3-methylbutyl and 3-fluoro-3-methylbutyl; R is a hydrocarbon group or a substituted hydrocarbon group, such as alkyl, alkenyl, aryl and aralkyl; Z is an electron withdrawing group, such as cyano, formyl, amido, alkoxycarbonyl, aryloxycarbonyl, aralkoxycarbonyl, alkylcarbonyl, cycloalkoxycarbonyl, carboxy, methylenehydroxy (—CH$_2$OH) and esters and ethers thereof, and methylene halide (—CH$_2$X); and Ac is a carboxylic acyl group.

In the practice of the above process, a polyolefin of Formula I is oxygenated photochemically to the allylic hydroperoxide (II). The photooxygenation is carried out in organic solvent in presence of a dye sensitizer and oxygen which is introduced into the solvent medium prior to introduction of the polyolefin. Preferably, the reaction medium is saturated with oxygen prior to introduction of the polyolefin to minimize side reactions and then oxygen continuously introduced until reaction is complete. The rate of reaction is largely dependent upon the intensity of the light and concentration of polyolefin. Various organic solvents inert to the reaction can be used and the choice of inert solvent does not seem to affect the rate of reaction. Suitable solvents include the alcohols, amines, ketones, dialkylsulfoxides, hydrocarbons, esters, and the like, such as ethyl acetate, t-butyl alcohol, bromobenzene, cyclohexanol, acetone, dimethylsulfoxide, carbon disulfide, benzene, pyridine, iodoethane, methanol, and the like. By proper choice of solvent, the process can be largely carried out in one vessel, e.g. by using pyridine, the photooxygenation, reduction and acylation can be carried out in one vessel without change of solvent. If it is desired to separate the allylic alcohol prior to acylation, an alcohol solvent is preferred. The hydroperoxide (II) is generally not isolated prior to reduction. In addition, the photooxygenation can be carried out with reducing agent, such as trialkylphosphite present in the reaction medium so that reduction is going on as hydroperoxide is formed. Higher yields are generally obtained when photooxygenation and reduction are two distinct steps. Suitable sensitizer dyes are the fluoresceins, porphyrins, polycyclic aromatic hydrocarbons and xanthene dyes, e.g. methylene blue, hematoporphyrin, tetrachlorofluorescein, rose bengal, erythrosin, chlorophyll, zinc tetraphenylporphine, and the like. Source of light can be sunlight, fluorescent lamp, mercury lamps, high pressure lamps and ordinary light bulbs.

The photooxygenation process generally gives the compounds of Formula II as the major product; however, there is generally other products obtained as can be illustrated by the following Formulas IIA, IIB and IIC and IID using methyl 3,7-dimethylnona-2,6-dienoate as an illustration. The other products as represented by IIB, IIC and IID are not separated until completion of the reduction, esterification or alkylation step. IIB is sometimes formed in fairly large amounts with IIC and IID being minor components.

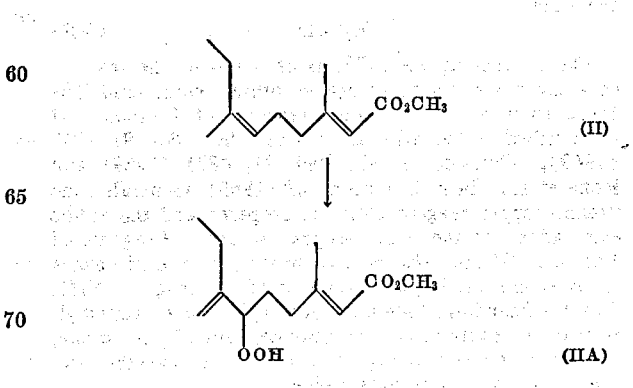

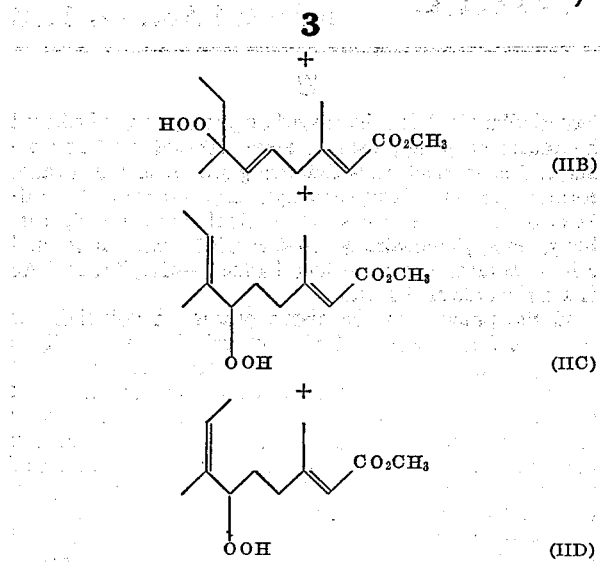

The reduction of the allylic hydroperoxide (II) into the allylic alcohol is carried out in the same or different organic solvent than that used in the photooxygenation step. Numerous reducing agents can be used, such as an alkali metal borohydride, trialkylphosphite, triarylphosphite, alkylaminophosphine, zinc, deactivated Raney nickel (prepared by exposing Raney nickel to acetone), aluminum amalgam; inorganic reducing agents, such as iodide anion with acid catalyst, such as HCl or acedic acid; catalysts, such as the catalytic hydrogenation catalysts, e.g. palladium, barium sulfite, and the like. Suitable phosphites include trimethylphosphite, triethylphosphite, triphenylphosphite, and the like. The reduction is generally carried out at room temperature, although higher or lower temperatures can be used, using a molar equivalent or more of the reducing agent.

Esterification of the allylic alcohol (III) to the acylate (IV) is conducted using a carboxylic anhydride or carboxylic acid halide, such as the chloride, in the same or different solvent in which the reduction is accomplished. Suitable esterification agents include acetic anhydride, propionic anhydride, benzoic anhydride, n-butyric anhydride, formic acetic anhydride, acetic propionic anhydride, heptoic anhydride, n-caproic anhydride, phenylacetic anhydride, p-methoxybenzoic anhydride, acetyl chloride, propionyl chloride, n-butyryl chloride, isobutyryl chloride, n-valeryl chloride, trimethylacetyl chloride, benzoyl chloride, and the like.

Alkylation of the allylic ester is accomplished using an organo-cuprate of Formula VII in which R may represent the same or different organo groups. The reaction is conducted in an organic solvent inert to the reaction, such as an ether or hydrocarbon, e.g. pentane, toluene, ether, tetrahydrofuran, monoglyme, benzene, diglyme or mixture of solvents, at a temperature of from about room temperature to about —100° C., generally from about 0° C. to —80° C. and is complete within a few minutes to a few hours.

$$R_2CuLi \qquad (VII)$$

The organo-cuprate (VII) is prepared by the reaction of a cuprous salt with an organo lithium compound. The preparation of organo-copper reagents of Formula VII is described by Siddall et al., J. Am. Chem. Soc. 91, 1853 (1969); Whitesides et al., Ibid. 91, 4871 (1969) and Rona et al., Chem. Commun., 43 (1969). Generally, the organo-copper reagent (VII) is prepared and the allylic ester added to the organo-copper solution. Reagents of Formula VII may also be used in the presence of ligands to overcome insolubility problems of the reagent (VII). Suitable ligands include tri(n-butyl)phosphine, trimethylphosphine, pyrrolidine, morpholine, trimethylphosphite, and other tertiary phosphines, tertiary phosphites, secondary amines and tertiary amines.

The dienes of Formula I herein R is hydrogen or lower alkyl are prepared by the reaction of a ketone of Formula IX using Wittig reagent or Emmons-Wadworth reaction.

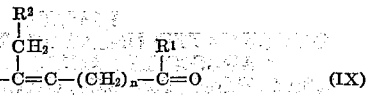

Thus, a ketone of Formula IX reacted with a compound of Formula X in the presence of sodium hydride, or the like, using the method of U.S. Patent 3,177,226.

wherein R is lower alkyl and Z is cyano, lower alkylcarbonyl, alkoxycarbonyl or amido affords the corresponding α,β-unsaturated compound:

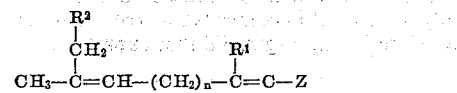

Preparation of the ketones (IX) and conversion thereof to α,β-unsaturated esters is fully described in my application Ser. No. 7,987, filed on even date herewith, entitled "Aliphatic Esters."

C-1 alcohol compounds of the Formula I (Z is —CH$_2$OH) are prepared by reduction of the corresponding ester (I; Z is —COOAlkyl) by treatment with one molar equivalent of lithium aluminum hydride in ether at 0° C. for about one hour. C-1 halide compound of Formula I (Z is CH$_2$X, wherein X is bromo or chloro) are obtained by treatment of the C-1 alcohol with phosphorus trichloride and phosphorus tribromide in benzene at about room temperature. Ethers of the Formula I can be prepared from either the C-1 halide or C-1 alcohol using conventional techniques, such as treatment of the C-1 alcohol with diazoalkane or with an alkyl halide, cyclohexyl halide, or the like, in the presence of alkali metal hydride.

The compounds provide by the process of the present invention, as well as the intermediates of Formulas III and IV, are useful per se, especially the compounds of Formula V, for the control of insects as set forth in my application Ser. No. 7,987, filed on even date herewith. The compounds provided by the present invention are useful in the perfume, pharmaceutical and polymer industries as intermediates and final products. See, for example, U.S. Patents 2,824,896, 2,840,583, 2,902,495, 3,023,178, 3,235,570, 3,383,276 and 3,455,997; Dahm et al., J. Am. Chem. Soc. 89, 5292 (1967) and Mori et al., Tetrahedron Letters 26, 2515 (1967).

The term "alkyl," as used herein, refers to saturated aliphatic hydrocarbons, branched and straight, having a chain length of one to twelve carbon atoms. The term "alkenyl," as used herein, refers to ethylenically unsaturated aliphatic hydrocarbons, branched or straight chain, generally of one to twelve carbon atoms. When either of the foregoing terms is modified by "lower," the group contains one to six carbon atoms. The term "cycloalkyl," as used herein, refers to a cyclic alkyl group of four to eight carbon atoms. The term "aralkyl" refers to a monovalent group in which an aryl group is substituted for a hydrogen atom of an alkyl group, such as benzyl, xylyl, mesityl, phenylethyl, methylbenzyl, naphthylmethyl and naphthylethyl. The organo group (R) of the organo-copper reagent need not be of any particular length, however, it generally contains less than 30 carbon atoms and more frequently less than 20 carbon atoms. The organo group can be of acyclic or cyclic structure, saturated or unsaturated, e.g. a hydrocarbon group such as alkyl, alkenyl (the double bond being spaced from the metal by at least two tetrahedral carbons), cycloalkyl, aryl, aralkyl, which can be substituted with non-interfering groups, such as alkoxy, alkylenedioxy, cycloalkoxy, fluoro, and the like.

The following examples are provided to illustrate the present invention. Temperature in degrees centigrade.

EXAMPLE 1

(A) A mixture of 11 g. of ethyl 3,7-dimethylnona-2,6-dienoate, 100 mg. of hematoporphyrin and 100 ml. of dry pyridine in a Pyrex vessel, into which is slowly and continuously bubbled oxygen, is irradiated by exposure to a 15 watt fluorescent lamp (about two inches from vessel) for about 40 hours. When starting material has disappeared as checked by thin layer chromatography, the reaction mixture, without isolation of the reaction product (ethyl 6-hydroperoxy-7-methylene-3-methylnon-2-enoate), is cooled to 5° and 7.5 g. of trimethylphosphite is added. The reaction is complete after about three hours to yield the allylic alcohol (ethyl 6-hydroxy-7-methylene-3-methylnon-2-enoate). Without isolation, there is added 3.2 ml. of acetic anhydride at room temperature. The mixture is stirred for about two hours, charcoal is added and then filtered. To the filtrate is added ice to destroy any excess acetic anhydride and then the solution poured into 450 ml. of ice cold 10% hydrochloric acid, which is then extracted with ether. The extracts are washed with water, saturated sodium chloride, saturated sodium bicarbonate and then brine, dried over sodium sulfate and evaporated to yield the allylic acetate (ethyl 6-acetoxy-7-methylene-3-methylnon-2-enoate) which can be purified by chromatography on silica.

(B) By repeating the processes of Part A using each of ethyl 3,7-dimethylocta-2,6-dienoate, ethyl 3,9-dimethyldeca - 2,8 - dienoate, ethyl 3,8-dimethylnona-2,7-dienote, ethyl 3,6-dimethylhepta-2,5-dienoate, ethyl 3-ethyl-7-methylnona-2,6-dienoate, ethyl 3,8-dimethyldeca-2,7-dienoate, ethyl 3,6-dimethylocta-2,5-dienoate and ethyl 3,9-dimethylundeca-2,8-dienoate in place of ethyl 3,7-dimethylnona-2,6-dienoate as as the starting material, there is obtained:

ethyl 6-hydroperoxy-7-methylene-3-methyloct-2-enoate,
ethyl 6-hydroxy-7-methylene-3-methyloct-2-enoate, and
ethyl 6-acetoxy-7-methylene-3-methyloct-2-enoate;
ethyl 8-hydroperoxy-9-methylene-3-methyldec-2-enoate,
ethyl 8-hydroxy-9-methylene-3-methyldec-2-enoate, and
ethyl 8-acetoxy-9-methylene-3-methyldec-2-enoate;
ethyl 7-hydroperoxy-8-methylene-3-methylnon-2-enoate,
ethyl 7-hydroxy-8-methylene-3-methylnon-2-enoate, and
ethyl 7-acetoxy-8-methylene-3-methylnon-2-enoate;
ethyl 5-hydroperoxy-6-methylene-3-methylhept-2-enoate,
ethyl 5-hydroxy-6-methylene-3-methylhept-2-enoate, and
ethyl 5-acetoxy-6-methylene-3-methylhept-2-enoate;
ethyl 6-hydroxyperoxy-7-methylene-3-ethylnon-2-enoate,
ethyl 6-hydroxy-7-methylene-3-ethylnon-2-enoate, and
ethyl 6-acetoxy-7-methylene-3-ethylnon-2-enoate;
ethyl 7-hydroperoxy-8-methylene-3-methyldec-2-enoate,
ethyl 7-hydroxy-8-methylene-3-methyldec-2-enoate, and
ethyl 7-acetoxy-8-methylene-3-methyldec-2-enoate;
ethyl 5-hydroperoxy-6-methylene-3-methyloct-2-enoate,
ethyl 5-hydroxy-6-methylene-3-methyloct-2-enoate, and
ethyl 5-acetoxy-6-methylene-3-methyloct-2-enoate; and
ethyl 8-hydroperoxy-9-methylene-3-methylundec-2-enoate,
ethyl 8-hydroxy-9-methylene-3-methylundec-2-enoate, and
ethyl 8-acetoxy-9-methylene-3-methylundec-2-enoate, respectively.

In the same manner, repeating the process of Part A using other carboxylic anhydrides, such as propionic anhydride or benzoic anhydride in place of acetic anhydride, the corresponding allylic ester is obtained, e.g. ethyl 6-propionoxy - 7 - methylene-3-methylnon-2-enoate, ethyl 6-benzoyloxy - 7 - methylene-3-methylnon-2-enoate, ethyl 6-propionoxy-7-methylene - 3 - methyloct-2-enoate and ethyl 6-benzoyloxy-7-methylene-3-methyloct-2-enoate.

By use of the foregoing processes, each of the corresponding methyl esters is converted into the corresponding hydroperoxide, allylic alcohol and allylic ester.

(C) To a mixture of 3.2 g. of cuprous iodide and 90 ml. of dry ether under nitrogen cooled to −10°, there is added 28.9 ml. (0.03 moles) of 3,3-dimethylbutyl lithium in ether.

After about 15 minutes, ethyl 6-acetoxy-7-methylene-3-methylnon-2-enoate (2.4 g.) is added. The reaction is worked up after 30 minutes by pouring into saturated ammonium chloride, extracting with ether and washing the ethereal extracts with saturated ammonium chloride, 10% hydrochloric acid and saturated sodium chloride. The ether extracts are dried over magnesium sulfate and evaporated to yield ethyl 3,11,11-trimethyl-7-ethyldodeca-2,6-dienoate which can be purified by distillation.

3,3-dimethylbutyl lithium is prepared from 1-chloro-3,3-dimethylbutane and lithium in ether in the presence of 1% sodium under argon.

(D) By repeating the process of Part C of this example, using each of allylic acetates of Part B as the starting material in place of ethyl 6-acetoxy-7-methylene-3-methylnon-2-enoate, there is obtained:

ethyl 3,7,11,11-tetramethyldodeca-2,6-dienoate,
ethyl 3,9,13,13-tetramethyltetradeca-2,8-dienoate,
ethyl 3,8,12,12-tetramethyltrideca-2,7-dienoate,
ethyl 3,6,10,10-tetramethylundeca-2,5-dienoate,
ethyl 3,7-diethyl-11,11-dimethyldodeca-2,6-dienoate,
ethyl 3,12,12-trimethyl-8-ethyltrideca-2,7-dienoate,
ethyl 3,10,10-trimethyl-6-ethylundeca-2,5-dienoate, and
ethyl 3,13,13-trimethyl-9-ethyltetradeca-2,8-dienoate, respectively. In the same manner, the corresponding methyl dienoates are prepared.

(E) The same procedure of Part C of this example is repeated with the exception of using 3,3-dimethylpentyl lithium in place of 3,3-dimethylbutyl lithium in the alkylation of the allylic acetates to yield:

ethyl 3,11,11-trimethyl-7-ethyltrideca-2,6-dienoate,
ethyl 3,7,11,11-tetramethyltrideca-2,6-dienoate,
ethyl 3,9,13,13-tetramethylpentadeca-2,8-dienoate,
ethyl 3,8,12,12-tetramethyltetradeca-2,7-dienoate,
ethyl 3,6,10,10-tetramethyldodeca-2,5-dienoate,
ethyl 3,7-diethyl-11,11-dimethyltrideca-2,6-dienoate,
ethyl 3,12,12-trimethyl-8-ethyltetradeca-2,7-dienoate,
ethyl 3,10,10-trimethyl-6-ethyldodeca-2,5-dienoate, and
ethyl 3,13,13-trimethyl-9-ethylpentadeca-2,8-dienoate, respectively.

EXAMPLE 2

(A) To 108 mg. of cuprous iodide in 7 ml. of ether at −10° under argon is added 0.174 ml. of vinyl lithium (3.1 M in ether). The suspension is stirred for about 0.5 hours at which time a negative Gilman test is obtained. Then 0.334 ml. of t-butyl lithium (1.62 M in ether) is added and additional cuprous iodide added with stirring until a negative Gilman test is obtained. Then, one molar equivalent of ethyl 6-acetoxy-7-methylene-3-methyloct-2-enoate is added while maintaining the temperature at about −10°. After about one hour, the reaction is washed up by pouring into saturated ammonium chloride, followed by extraction with ether. The ether extracts are combined and washed with brine, dried over magnesium sulfate and evaporated under reduced pressure to yield ethyl 3,7,9,9-tetramethyldec-2,6-dienoate.

(B) The process of Part A is repeated with the exception of using an equivalent amount of neopentyl lithium in place of t-butyl lithium to yield ethyl 3,7,10,10-tetramethylundeca - 2,6 - dienoate. By repeating this procedure using methyl 6 - acetoxy - 7 -methylene - 3- methylnon-2-enoate and methyl 6-acetoxy-7-methylene-3-methyloct - 2 - enoate to yield methyl 7-ethyl-3,10, 10-trimethylundeca-2,6-dienoate and methyl 3,7,10,10-tetramethylundeca - 2,6 - dienoate, respectively. Likewise, methyl 3,9,9-trimethyl-7-ethyldec-2,6-dienoate is obtained by using methyl 6-acetoxy-7-methylene-3-methyloct-2-enoate in the procedure of Part A.

EXAMPLE 3

To a solution of 2 g. of lithium di-t-butyl(tri-n-butylphosphine) cuprate in tetrahydrofuran at −78° under argon is added one molar equivalent of ethyl 6-acetoxy-7-methylene-3-methyloct-2-enoate while maintaining the temperature at about −78°. After about ten hours, the mixture is poured into saturated ammonium chloride and extracted with ether. The ether extracts are combined, washed with brine, dried over magnesium sulfate and evaporated to yield ethyl 3,7,9,9-tetramethyldec-2,6-dienoate.

Ethyl 3,6,8,8 - tetramethylnona - 2,5 - dienoate is obtained from ethyl 5 - acetoxy - 6 - methylene - 3 - methylhept-2-enoate using the foregoing process.

EXAMPLE 4

(A) A mixture of 10.9 g. of methyl 3,7-dimethylocta-2,6-dienoate, 100 mg. of hematoporphyrin and 100 ml. of dry pyridine in a Pyrex flask, into which is slowly and continuously bubbled oxygen, is irradiated by exposure to a 15 watt fluorescent lamp (about two inches from flask) for 40 hours. When starting material has disappeared as checked by thin layer chromatography, the mixture which contains methyl 6-hydroperoxy-7-methylene-3-methyloct-2-enoate is cooled to 5° and 7.5 g. of trimethylphosphite is added. The reaction is complete after about three hours to yield methyl 6-hydroxy-7-methylene-3-methyloct-2-enoate. Without isolation, there is added 32.5 ml. of acetic anhydride at room temperature. The mixture is stirred for about two hours, charcoal is added and then filtered. To the filtrate is added ice to destroy any excess acetic anhydride and then the solution poured into 450 ml. of ice cold 10% hydrochloric acid which is then extracted with ether. The ether extracts are washed with water, saturated sodium chloride and saturated sodium bicarbonate, dried over sodium sulfate and evaporated to yield methyl 6-acetoxy-7-methylene-3-methyloct-2-enoate which can be purified by chromatography on silica eluting with hexane/ether.

(B) To a mixture of 3.2 g. of cuprous iodide and 90 ml. of dry ether under nitrogen, cooled to −10°, there is added 28.9 ml. (0.03 mole) of 3,3-dimethylbutyl lithium in ether.

After about 15 minutes, methyl 6-acetoxy-7-methylene-3-methyloct-2-enoate (2.4 g.) is added. The reaction is worked up after 30 minutes by pouring into saturated ammonium chloride, extracting with ether and washing with saturated ammonium chloride, 10% hydrochloric acid and saturated sodium chloride. The ether extracts are dried over magnesium sulfate and evaporated to yield methyl 3,7,11,11-tetramethyldodeca-2,6-dienoate which can be purified by distillation.

EXAMPLE 5

Ethyl 3,7,11-trimethyldodeca-2,6,10-trienoate (2.4 g.) and 50 mg. of hematoporphyrin is dissolved in 50 ml. of pyridine. Oxygen is bubbled through the solution while exposing it to a 15 watt fluorescent lamp (about one-half inch from reaction flask) for about 16 hours. The reaction solution which contains ethyl 6,10-(bis)hydroperoxy-7,11 - dimethylene-3-methyldodec-2-enoate is cooled below room temperature and 1.13 g. of trimethylphosphite added. After about two hours, the thus-formed ethyl 6,10-dihydroxy-7,11-dimethylene - 3 - methyldodec - 2 - enoate (without isolation) is treated with 5.20 g. of acetic anhydride for two hours to yield ethyl 6,10-diacetoxy-7,11-dimethylene-3-methyldodec-2-enoate which is worked up by extraction with ether.

To a mixture of 134 mg. of cuprous iodide in 5 ml. of dry ether under nitrogen, cooled to −10°, is added 0.8 ml. of 1.65 M methyl lithium in ether. Ethyl 6,10-diacetoxy-7,11-dimethylene-3-methyldodec - 2 - enoate (50 mg.) is then added. The reaction is worked up after 30 minutes by pouring into saturated ammonium chloride and extracting with ether. The ether extracts are washed, dried over sodium sulfate and evaporated to yield ethyl 3,11-dimethyl-7-ethyltrideca-2,6,10-trienoate which can be purified by distillation.

EXAMPLE 6

(A) Ethyl 10,11 - oxido-3,7,11-trimethyldodeca-2,6-dienoate (100 mg.) is dissolved in 2.5 ml. of dry pyridine to which is added 2.9 mg. of hematoporphyrin. The solution is then exposed to a 15 watt fluorescent lamp (about two inches from vessel) for 18 hours. Charcoal is added and the reaction solution filtered to yield ethyl 6-hydroperoxy-7-methylene-10,11-oxido - 3,11 - dimethyldodec-2-enoate which can be isolated from the filtrate by extraction with ether. Instead of isolating the 6-hydroxyperoxide, the filtrate is cooled to 5° and 0.04 ml. of trimethylphosphite added. The mixture is stirred for about 2.5 hours to complete reduction of the hydroperoxide to ethyl 6-hydroxy-7-methylene-10,11 - oxido-3,11-dimethyldodecenoate. To the reaction solution, without isolation of the 6-hydroxy compound, is added 0.25 ml. of acetic anhydride and the mixture stirred at room temperature for two hours. The reaction mixture is worked up by addition of water and pouring into saturated sodium chloride and extraction with methylene chloride. The methylene chloride extracts are washed with water, dried and evaporated under reduced pressure to yield ethyl 6-acetoxy-7-methylene-10,11-oxido-3,11-dimethyldodec-2-enoate which can be purified by chromatography.

(B) To 42 mg. of cuprous iodide in 4 ml. of ether under argon at −10° is added 0.24 ml. of methyl lithium (1.65 M in ether). After the solution gives a negative Gilman test, 50 mg. of the allylic acetate of Part A is added. After 30 minutes, the solution is poured into saturated ammonium chloride and ether added. The ether layer is washed with saturated sodium chloride solution, dried over sodium sulfate and evaporated under reduced pressure to yield ethyl 10,11-oxido-3,11-dimethyl-7-ethyldodeca-2,6-dienoate which is purified by chromatography.

EXAMPLE 7

(A) mixture of 11 g. of ethyl 3,7-dimethylnona-2,6-dienoate, 100 mg. of hematoporphyrin and 100 ml. of methanol in a Pyrex vessel, into which oxygen is rapidly and continuously bubbled, is irradiated by exposure to a 400 watt fluorescent lamp (about two inches from vessel) for about two hours, until starting material has disappeared as checked by thin layer chromatography. The reaction mixture, without isolation of the reaction product (ethyl 6-hydroperoxy-7-methylene-3-methylnon - 2 - enoate), is cooled to 5° and 7.5 g. of trimethylphosphite is added. The reduction is complete after about three hours to yield the allylic alcohol (ethyl 6-hydroxy-7-methylene-3-methylnon-2-enoate). After removal of about two-thirds of the solvent methanol, the mixture is diluted with water and extracted with hexane.

The hexane extracts are washed with water, saturated sodium chloride, saturated sodium bicarbonate and then brine, dried over sodium sulfate and evaporated to yield the allylic alcohol (ethyl 6-hydroxy-7-methylene-3-methylnon-2-enoate) which can be purified by fractional distillation under reduced pressure.

(B) The process of Part A is repeated with the exception of using each of N,N-diethyl 3,7-dimethylocta-2,6-dienamide, N,N - diethyl 3,7 - dimethylnona-dienamide, 1-ethoxy - 3,7 - dimethylocta - 2,6 - diene and 1 - ethoxy-3,7-dimethylnona-2,6-diene to yield the corresponding allylic hydroperoxide and allylic alcohol, i.e. N,N-diethyl 6-hydroperoxy - 7 - methylene - 3 - methyloct - 2 - enamide and N,N - diethyl 6-hydroxy-7-methylene-3-methyloct-2-enamide; N,N - diethyl 6 - hydroperoxy - 7 - methylene-3-methylnon-2-enamide and N,N-diethyl 6-hydroxy-7-methylene-3-methylnon-2-enamide; 1-ethoxy-6-hydroperoxy-7-methylene-3-methyloct-2-ene and 1 - ethoxy-6-hydroxy-7-methylene-3-methyloct-2-ene; and 1 - ethoxy-6-hydroperoxy - 7 - methylene-3-methylnon-2-ene and 1-ethoxy-6-hydroxy-7-methylene-3-methylonon-2-ene, respectively.

(C) Each of the allylic alcohols of Parts A and B is treated with acetic anhydride in pyridine to yield the corresponding allylic acetate, i.e.—ethyl 6-acetoxy-7-methylene-3-methylnon-2-enoate, N,N-diethyl 6-acetoxy-7-methylene-3-methyloct-2-enamide, N,N-diethyl 6 - acetoxy - 7 - methylene-3-methylonon-2-enamide, 1-ethoxy - 6 - acetoxy-7-methylene-3-methyloct-2-ene and 1-ethoxy-6-acetoxy-7-methylene-3-methylnon-2-ene, respectively.

In the same manner, by using other carboxylic anhydrides, such as propionic anhydride, benzoic anhydride, n-butyric anhydride, and the like, in place of acetic anhydride, the corresponding allylic acylates are obtained.

EXAMPLE 8

(A) A solution of 2 g. of methyl 3,7-dimethylnona-2,6-dienoate in 20 ml. of dry ether is added with stirring to 0.3 g. of lithium aluminum hydride, covered in ether at 0°. After about one hour, 2 ml. of acetic acid is added. The mixture is washed with ice water and the ether phase dried and evaporated to yield 3,7-dimethylnona-2,6-dien-1-ol.

Similarly, methyl 3,7-dimethylocta-2,6-dienoate is reduced to 3,7-dimethylocta-2,6-dien-1-ol.

(B) To one g. of 3,7-dimethylnona-2,6-dien-1-ol in 15 ml. of dry ether is added one molar equivalent of diazoethane. One drop of boron/trifluoride is added and the mixture allowed to stand one hour at 0° and then at room temperature for two additional hours. The mixture is then washed with water and organic phase evaporated to yield 1-ethoxy-3,7-dimethylnona-2,6-diene.

The use of diazomethane and diazopropane yields the corresponding methyl ether and propyl ether.

(C) One gram of 3,7-dimethylnona-2,6-dien-1-ol in 10 ml. of diglyme is added dropwise to a slurry of 0.75 g. of sodium hydride in 10 ml. of diglyme under nitrogen. To this mixture is added 0.7 g. of 2-chlorotetrahydropyran. The mixture is then stirred at about 25° for 30 minutes and then quenched in ice water. The organic phase is separated and aqueous phase re-extracted with ether. The combined organic materials are washed with water, dried over sodium sulfate and evaporated to yield 1-(tetrahydropyran-2'-yloxy)-3,7-dimethylnona-2,6-diene.

By using 2-chlorotetrahydrofuran, cyclohexyl chloride and other hydrocarbon chlorides or bromide in the above procedure, the corresponding ethers are obtained.

(D) To a mixture of 3,7-dimethylnona-2,6-dien-1-ol and 25 ml. of benzene at 0° is added a solution of 4 ml. of phosphorus tribromide in 18 ml. of benzene over 15 minutes. The mixture is stirred at 0° for one hour and then heated at 40° for two hours. The mixture is poured into ice water and extracted with pentane. The extracts are combined, washed with aqueous sodium bicarbonate, water and then brine, dried and evaporated to yield 1-bromo-3,7-dimethylnona-2,6-diene.

The use of phosphorus trichloride in the above procedure affords 1 - chloro - 3,7 - dimethylnona-2,6-diene. Similarly, 1-bromo- and 1-chloro-3,7-dimethylocta-2,6-diene are obtained.

(E) A mixture of 1-bromo-3,7-dimethylnona-2,6-diene (1 g.), sesamol (resublimed, 0.8 g.), potassium carbonate (dry, 0.3 g.) and dimethylacetamide (20 ml.) is heated under reflux for three hours. The mixture is then poured into water and extracted with pentane. The crude product is purified by chromatography eluting with hexane/ethyl acetate to yield 1-(3',4'-methylenedioxy)-3,7-dimethylnona-2,6-diene.

EXAMPLE 9

(A) To a 15% solution of butyl lithium in hexane (420 ml.) is added at −10° with stirring a solution of dry diethylamine (49 g.) in dry ether (530 ml.). The mixture is then stirred for one hour at 20° to provide one molar solution of diethylamino lithium.

About 30 ml. of the thus-prepared solution is added to methyl 3,7-dimethylnona-2,6-dienoate (10 g.) in dry ether (75 ml.) and the reaction mixture stirred for four hours at room temperature. The mixture is washed with aqueous 0.1 N HCl and then water, dried over sodium sulfate and evaporated to yield N,N-diethyl 3,7-dimethylnona-2,6-dienamide.

By using other amines, such as ethylamine, dimethylamine, and the like, in the foregoing procedure, the corresponding amide is obtained.

By using methyl 3,7-dimethylocta-2,6-dienoate as the starting material, N,N-diethyl 3,7-dimethylocta-2,6-dienamide is obtained.

EXAMPLE 10

To 486 mg. of cuprous iodide in 10 ml. of dry ether, under argon, at −10°, is added 2.82 ml. of 1.6 M methyl lithium in ether. Stirred at −10° for 20 minutes and then 342 mg. of the ethylene ketal of 5-acetoxy-6-methyleneheptan-2-one in 15 ml. of ether is added and stirred for 30 minutes. The mixture is then poured into water and the crude product (cis and trans isomers of ethylene ketal of 6-methyloct-5-en-2-one) extracted by ether and purified and separated by chromatography. The ketal thus-obtained is hydrolyzed by stirring in acetone containing several drops of 1 N HCl for six hours at room temperature to yield 6-methyloct-5-en-2-one which is treated with diethyl carbethoxymethylphosphonate in presence of sodium hydride to yield ethyl 3,7-dimethylnona-2,6-dienoate.

The ethylene ketal of 5-acetoxy-6-methylenheptan-2-one is obtained by use of the procedure of Example 1 starting with the ethylene ketal of 6-methylhept-5-en-2-one.

What is claimed is:

1. A compound selected from those of the formula:

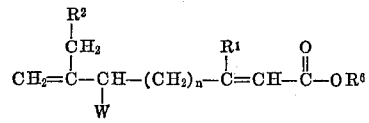

wherein,

W is the group —OOH, —OH or —OAc;
$n$ is an integer of one to four;
$R^1$ is lower alkyl;
$R^2$ is hydrogen or lower alkyl;
$R^6$ is hydrogen, lower alkyl, cycloalkyl or aralkyl; and
Ac is a carboxylic acyl group.

2. A compound according to claim 1 wherein $R^1$ is methyl; $R^2$ is hydrogen or methyl; and $n$ is two.

3. A compound according to claim 2 wherein $R^2$ is methyl; $R^6$ is methyl or ethyl; and W is hydroxy.

4. A compound according to claim 2 wherein $R^2$ is methyl; $R^6$ is methyl or ethyl; and W is OAc in which Ac is acetyl, propionyl or benzoyl.

5. A compound according to claim 2 where $R^6$ is lower alkyl.

6. A compound according to claim 2 wherein W is hydroxy and $R^6$ is lower alkyl.

7. A compound according to claim 2 wherein W is —OOH and $R^6$ is lower alkyl.

References Cited

UNITED STATES PATENTS 3,173,942   3/1965   Barton et al. _____ 260—490

OTHER REFERENCES

Chemical Abstracts 62, 3929f (1965).

LEWIS GOTTS, Primary Examiner

D. G. RIVERS, Assistant Examiner

U.S. Cl. X.R.

204—161, 158 R; 260—340.5, 340.9, 345.9, 347.8, 404, 348 R, 406, 410, 410.5, 410.9 R, 413, 476 R, 484 A, 484 R, 486 R, 488 H, 488 J, 593 R, 610 R, 611 R, 632 R, 638 A, 654 R; 424—312